United States Patent [19]

Calvert et al.

[11] Patent Number: 4,490,327
[45] Date of Patent: Dec. 25, 1984

[54] EXTERNAL CENTER PIN FOR BLOW MOLDING MACHINE

[75] Inventors: James W. Calvert; Samuel Belcher, both of Cincinnati, Ohio

[73] Assignee: Cincinnati Milacron Industries, Inc., Cincinnati, Ohio

[21] Appl. No.: 560,571

[22] Filed: Dec. 12, 1983

Related U.S. Application Data

[62] Division of Ser. No. 345,246, Feb. 3, 1982, Pat. No. 4,457,688.

[51] Int. Cl.³ .............................................. B29C 17/07
[52] U.S. Cl. ................................. 264/533; 264/531
[58] Field of Search ............... 264/523, 526, 529, 531, 264/532, 533, 535, 537, 538; 425/525, 529, 533, 528, 538

[56] References Cited

U.S. PATENT DOCUMENTS

| | | | |
|---|---|---|---|
| 2,331,702 | 10/1943 | Koditke | 264/537 |
| 3,347,966 | 10/1967 | Seefluth | 264/537 X |
| 3,757,718 | 9/1973 | Johnson | 264/531 X |
| 3,949,033 | 4/1976 | Uhlig | 264/89 |
| 4,036,926 | 7/1977 | Chang | 264/94 |
| 4,364,721 | 12/1982 | Rainville | 264/531 X |

FOREIGN PATENT DOCUMENTS

| | | | |
|---|---|---|---|
| 2610259 | 8/1977 | Fed. Rep. of Germany | 425/533 |
| 2705775 | 8/1978 | Fed. Rep. of Germany | 264/530 |
| 1350886 | 12/1963 | France | |
| 2061800 | 5/1981 | United Kingdom | |
| 2076731 | 12/1981 | United Kingdom | 264/532 |

Primary Examiner—Jan Silbaugh
Attorney, Agent, or Firm—Donald Dunn

[57] ABSTRACT

A blow molding machine is provided with an external center pin so that blowing is accomplished without introducing a mechanical or rigid member within the preform and/or bottle. To do this, the blowing is done by introducing a fluid, preferably a gas such as air, into the preform to expand it. Outside of the preform, meanwhile, is the subject center pin or center rod which is located on the preform center line (axis) and near the middle of the preform bottom. The rod receives a gate disposed centrally on the bottom of the preform when the preform is expanded by the entering fluid. In this manner, the center part of the bottom of the preform is engaged by the center pin which thereafter keeps the preform on center as the blowing action continues. A process is disclosed of blowing using a compressed fluid alone inside the preform to expand the preform axially against the bias of an external resiliently biased center pin.

8 Claims, 7 Drawing Figures

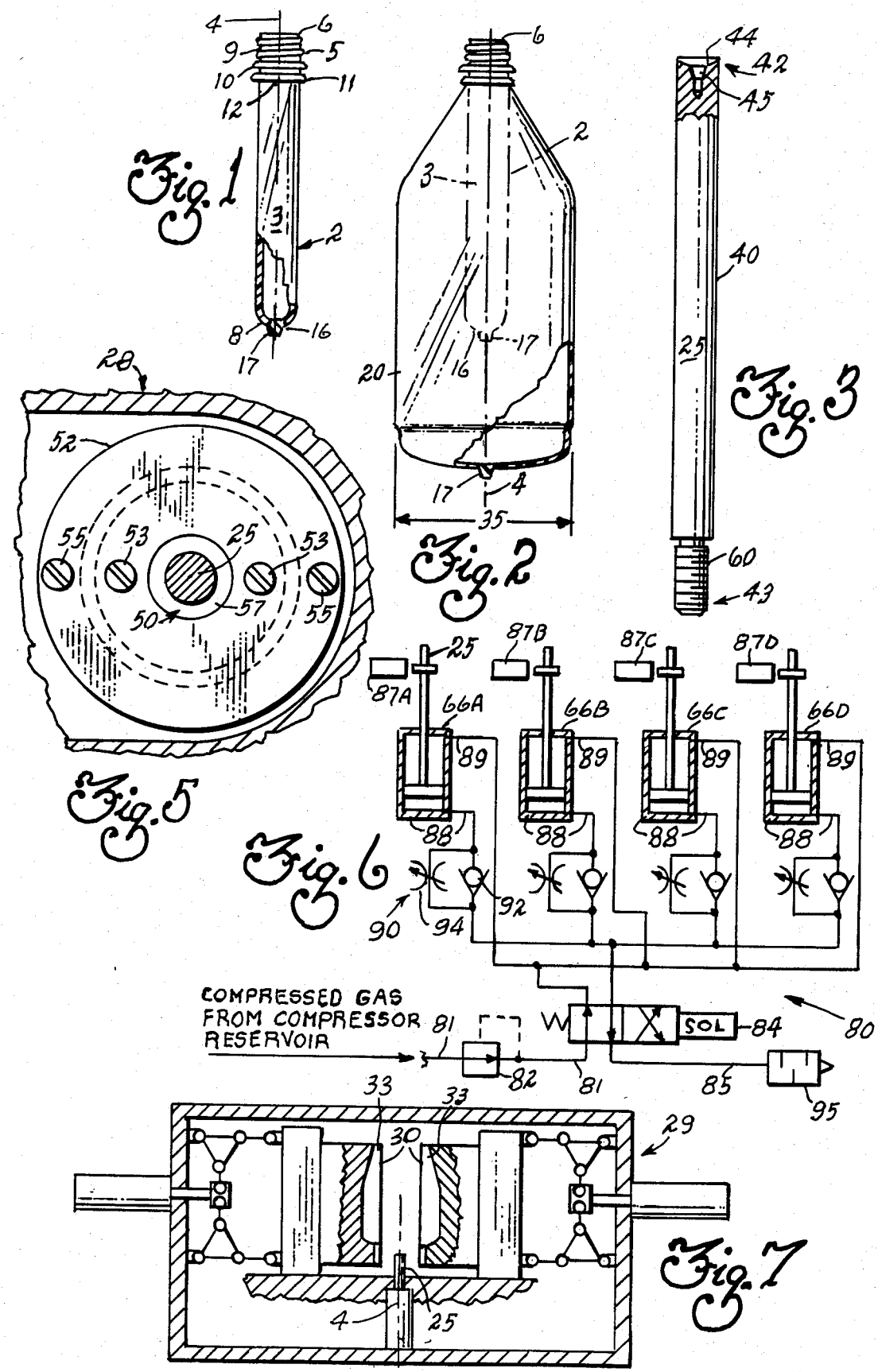

EXTERNAL CENTER PIN FOR BLOW MOLDING MACHINE

This is a division of application Ser. No. 345,246 filed Feb. 3, 1982, now U.S. Pat. No. 4,457,688.

This invention relates to an external center pin for a blow molding machine. One aspect relates to an external center pin or rod for blow molding a bottle from an injection molded preform of polyethylene terephthalate (PET). An aspect relates to a blow molding machine having at its blow station an external center rod for use in blow molding and biaxially orienting a bottle from an injection molded preform of polyethylene terephthalate (PET). An aspect of the invention relates to a machine for blow molding a plastic bottle of biaxially oriented polyester which has an external center pin that cooperates with pneumatically operated means to maintain the parison centered during blowing in connection with which the invention, by way of example but not limitation will now be described.

An aspect is a process of blowing using compressed fluid alone inside the preform and an external center rod alone on the outside of the bottom.

For purposes of description, it is assumed herein that the preform is an injection molded PET workpiece shaped generally like a test tube as illustrated and described in U.S. Pat. Nos. 3,958,685; 3,955,697; and 3,900,120. That is, the preform is tubular (normally cylindrical), closed at one end with a gate extending outwardly from the middle, and open at the other end.

In blow molding machines, it is known to use a rod at the blow station to assist in the blowing operation. It is very common to use a rod that extends or telescopes inside the parison to stretch the parison. It is also known to insert a rod into a parison to keep it centered during or after blowing, the rod actually not stretching (compressed air for blowing doing that), merely centering or holding on center. It is also known to use a pair of rods (one inside, one outside) which pinch the preform bottom between them, stretch the preform by moving in unison toward the mold bottom, and—upon reaching the mold bottom or a position equivalent thereto—stopping thus holding the preform in position and then completing expansion of the preform in the hoop direction. It is also known to use a three part mold to form hollow containers where two parts are opposed mold halves that define a container-shaping cavity and the third part defines the bottom of the product, normally a hollow container and occasionally, a bottle.

The present invention blows using air alone (more broadly, a pressurized fluid) inside the preform/bottle and an external center rod alone outside, which latter does not really stretch. Distinctions over the art are best appreciated by describing a blowing operation using the present invention, i.e. using an external center rod only in a machine for blow molding. In the preferred embodiment the center rod is positioned close to but not touching the unblown preform and centered on the gate by using an air-operated pneumatic cylinder and then air is admitted into the preform to blow.

The first part of the blowing operation causes the preform to elongate a very short amount, e.g. 0.015 inches, until it engages the external center rod. Indeed, upon engagement of rod by preform the protruding gate is received in a recess provided in the center rod if there is a gate. As the blowing continues, the preform elongates (along its lengthwise axis) and diametrally expands (i.e. expands in the hoop direction). The center rod keeps the preform on center. The blow air alone doing the elongating. At the end of the blow, the product, (usually a bottle) is fully expanded in the hoop and axial or length directions and the center rod as reached a predetermined bottom position.

It will be noticed that the present invention does not, as in much prior art, involve inserting a rod into the preform to stretch. Instead, only the blowing fluid (preferably a gas under superatmospheric pressure, most preferably compress air) is used to stretch (i.e. elongate)—as well as to expand in the hoop direction. Even more, the external center rod seats the gate protruding from the preform and thus minimizes crystallization in the center part of the bottle bottom. More, the blow air (more broadly blow fluid) biases the preform against the external center rod which in turn is supported by a means that yieldingly resists such bias but gives way as the preform expands. Further, although superficially resembling a three-part mold, the present external center rod coacts with a two part mold, needing only a small round opening on the bottom parting line within which slides the center rod support—a plunger or support rod. Preferably also, a double acting pneumatic cylinder provides the aforesaid center rod support as well as a means to position the center rod and the means that yieldingly resists while giving way.

The present invention also involves an improvement in a process that is otherwise old (see next sentence for the old part) that comprises the steps of providing a center pin movable along said axis within said cavity having a shaped face with a recess therein to receive said gate and an annular bottom surface surrounding said recess of a size in the hoop direction at least that of the aforesaid more crystalline area; inserting the preform between the individual mold parts, closing the mold parts and forming said cavity; inserting the blow plug; positioning the gate within the recess and the crystalline area against said annular surface; blowing said bottle by admitting a blowing fluid into the preform through said blow plug and expanding the preform in the hoop direction and along said axis; and maintaining the center pin substantially engaged as in said positioning step during said blowing step. The otherwise old process involves making a plastic bottle of biaxially oriented polyester resin by blow molding within a blow mold assembly an injection molded elongated tubular preform which is shorter than said bottle and that has one end open and the other end closed, the closed end having a gate extending outward therefrom and being substantially centrally located and surrounded by an area that including the gate is more crystalline than the rest of the preform, the blow mold assembly being openable and of several individual molds which are openable and which assemble to form along an axis a cavity shaped substantially like the bottle and providing for expansion of the preform along said axis and in a direction substantially normal thereto (called the hoop direction) the open end of the preform being held substantially on said axis by a neck ring which also cooperates with the blow mold assembly to seal the neck end of the cavity, the machine also having a blow plug means for entering the open end of the preform and directing blowing fluid into the preform to form a bottle by expanding same into engagement with the mold walls defining said cavity, there being no mechanical element that enters the preform and engages the interior bottom portion thereof.

Other aspects, objectives, and features will become apparent from reading the following specification in conjunction with the annexed drawings wherein FIG. 1 is a partly cutaway illustration of a typical preform of polyethylene terephthalate (PET) in particular illustrating the gate at the bottom;

FIG. 2 is a partly cutaway illustration of a typical blown bottle of polyethylene terephthalate (PET) in particular illustrating the gate at the bottom and also showing in dotted lines or ghost the FIG. 1 preform from which it is blown;

FIG. 3 is a side view of a preferred embodiment of the center rod according to this invention;

Figure 4:
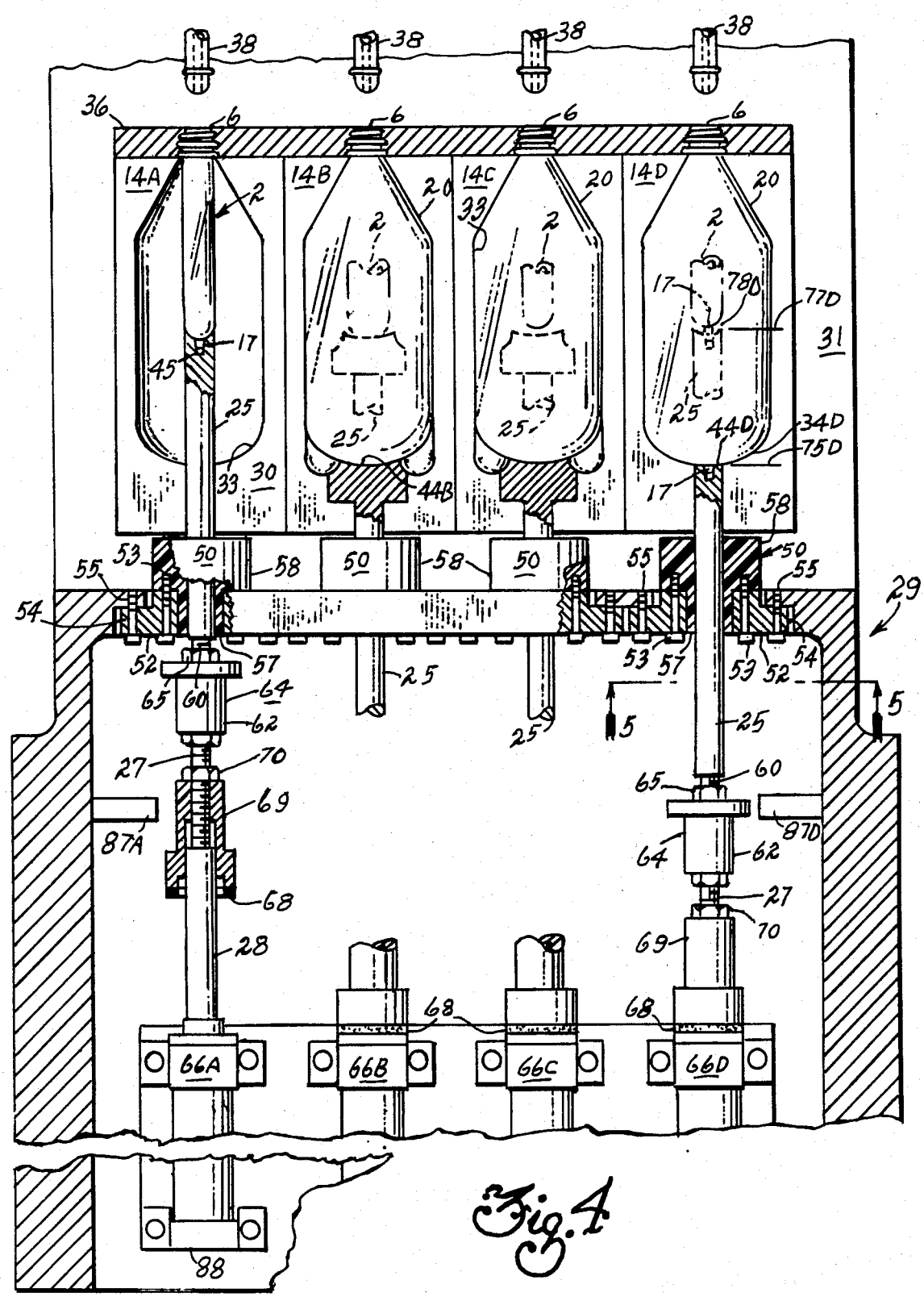

FIG. 4 is a front view of a typical four lane blow molding machine of the well-known Cincinnati Milacron RHB-V construction each lane of which is modified with a centering pin means, support means and reciprocating means according to the present invention but wherein literary license is taken to show something different in each lane, namely lanes A, B, C, D from left to right: A, a center rod with a gate recess engaged by a preform with a gate within a mold shown in section; B, an ungated preform and a center rod engaged and ghosted (dotted line) upon a blown freestanding bottle within a mold therefor; C, the aforesaid ungated preform and center rod spaced apart before blowing and superimposed in ghost or dotted lines on the freestanding bottle in mold; and D, the gated preform and gate recessed center rod in their preblow position superimposed on a section of blown bottle in the mold.

FIG. 5 is a view along 5—5 of FIG. 4 showing the sliding bearing support means for the pin of FIGS. 3,4;

FIG. 6 schematically describes a preferred embodiment of the reciprocating means of FIG. 4, viz., a double acting pneumatic system; and FIG. 7 is a schematic side view of FIG. 4.

Referring now to FIGS. 2 and 4 there is illustrated the workpiece 2 being handled which is preferably an injection molded preform of polyethylene terephthalate (PET) shaped generally like a test tube and of circular cross-section. On top of a long cylindrical body 3 extending along an axis 4 is a finish 5 that surrounds an open end 6, and other end 8 of the body being closed. The finish ordinarily will contain a threaded lip 9 superimposed immediately above a pilfer-proof ring 10 which is spaced closely above a support ring 11. The underside 12 of the support ring is preferably perfectly flat and normal to the lengthwise axis 4 along which the preform extends. This undersurface is used as a locating surface to position the preform relative to the blow mold assembly 14 (FIG. 4) and for that matter, relative to other machine parts. The central region 16 of the closed end of the preform is usually crystallized and has a protruding gate 17 which is formed in connection with the injection molding of the preform. Preforms having essentially the same shape as the afore described injection molded preforms and usable in the practice of this invention are also obtainable by the well known extrusion/parison molding method wherein an extruded tube, open at both ends is placed in a mold and the afore described shaped open and closed ends of the injection molded preform are formed.

When the preform 2 enters the blow mold 14 of the present machine, it is blown into the configuration of a bottle such as illustrated in FIGS. 2 and 4. The present invention is for use in connection with the blowing procedure and provides means for externally engaging the bottom central region 16 of the preform, including the gate 17, on the outside of the preform and moving along the longitudinal axis 4—i.e. axially—of the preform 2 during blowing until complete elongation occurs, i.e., blowing in the lengthwise direction until the preform 2 has extended to the full length of the intended bottle. The ghost image of the preform 2 within the bottle 20 (dotted lines of FIG. 2) depicts a sort of before and after image of this.

Speaking generally and briefly, an unvarnished description of the present invention is that it provides an external center pin 25 (FIGS. 3 and 4) in the blow mold 14 so that blow molding is accomplished without introducing a mechanical or rigid member within the preform 2 and/or bottle 20. FIGS. 3,4 and 5 illustrate the cylindrical center pin 25 and the environment in which it is used. In the preferred embodiment, a center pin constructed as illustrated in FIGS. 3 and 4 is connected to the end 27 of a pneumatic cylinder plunger 28. The pneumatic system, per FIG. 6 positions the center rod 25 within the mold 14 and then affords a resilient bias so that the pin or rod 25 remains engaged against the bottom of the preform while it is being blown into the bottle shape. A detailed description of a machine and process embodying the invention now follows.

FIGS. 4 and 7 show the four lane machine 29 making the plastic bottle of FIG. 2. This is done by blow molding within the blow mold assembly 14 (of which four assemblies 14A, 14B, 14C and 14D are illustrated for respective lanes A, B, C and D). Each blow mold assembly 14A . . . 14D (hereafter called 14 unless a specific one is indicated by its postscript) is openable and consists of a pair of matching individual mold haves 30, which are openable in a plane normal to that of the drawing and which assemble to form along axis 4 a cavity 33 shaped substantially like the bottle and provides for expansion of the preform 2 along the preform bottle-mold-cavity axis 4 and in a radial and/or peripheral direction 35 (FIG. 2) substantially normal thereto (called the hoop direction). The open end 6 of the preform 2 is held substantially on said axis by the neck ring 36 which also cooperates with the blow mold assembly 14 to seal the neck end of the cavity. The machine 29 also has a blow plug means 38 that enters the open end of the preform and directs blowing fluid—normally clean compressed air—into the preform 2 to form a bottle by expanding same into engagement with the mold walls defining cavity 33. There is no rigid mechanical element (except plug 38) that both enters the preform and engages the interior bottom portion thereof e.g. to stretch or to assist in keeping the preform on center during blowing and/or to pin the preform on center against the mold bottom after elongation. Machine 29 includes a frame 31 on which the blow molds and various drive and blow means are mounted.

The description of FIG. 4 above summarizes the four different things shown in the four lanes A,B,C and D of FIG. 4. Lanes C and D show the spaced-apart relationship assumed by preform bottom and center rod 25 for ungated and gated preforms, respectively. Lanes A and B show the preform and center rod relationship for gated and ungated, respectively, at the moment of engagement, which is achieved by initially blowing the preform so it elongates into engagement. A type of freestanding bottle and mold are illustrated in section in the middle two lanes B, C and similarly in lanes A, D as to a roundbottomed bottle which in the trade is often called a two piece bottle because subsequent operations must add to its bottom a base cup or ring so it can stand.

The freestanding bottle of the two middle lanes does not need a base cup added because it has feet of some kind molded into the bottom by the shape provided by the coaction between the center rod and mold surface.

FIG. 3 illustrates the details of how a preferred embodiment of the centering pin 25 is constructed while FIG. 4 illustrates a preferred environment in which the same is applied. The centering pin is preferably an elongated cylindrical member having a cylindrical sliding bearing surface 40 extending substantially from its mold end 42 to its support end 43. Preferably, the bearing surface 40 is highly polished and may even be chrome plated or otherwise coated to resist corrosion which may occur in the environment of use. The mold end 42 consists in a shaped upper face 44 for engaging the closed end central region 16 and gate 17 of the preform, preferably to engage most of the central region 16 of the preform end which is or may be crystallized. The crystallization of PET is normally indicated by cloudiness or even white color whereas the rest of the preform is substantially transparent. In any event, the shaped upper face contains a recess 45 located approximately centrally and of a size to receive the gate 17 on the preform. The bearing surface 44 is contoured at its periphery to fair into the individual mold parts to give the desired shape to the finished bottle. In the illustrated embodiment, this fairing involves a spherical surface surrounding the recess but it may, of course, have other shapes depending on what the ultimate bottle bottom shape is supposed to be.

The center rod 25 is supported to slide or reciprocate by a plastic bushing 50 (FIGS. 3, 4 and 5) that is secured coaxially with the center rod, preform and intended axis 4 of the bottle. The bushing 50 and center rod 25 have a sliding bearing relationship. The bushing is part of the support means for the center rod and is held in place by an insert 52 that is secured to it by a pair of screws 53. The assembly of bushing and center rod is in turn held in place so they don't fall out underneath the blow mold by an insert flange 54 (which is integral with the insert) which in turn is secured to the machine frame by a pair of bolts or screws 55. Preferably, the bushing and insert 50, 52 are interfitted flanged cylinders—as illustrated.

It will be observed from FIGS. 3, 4 and 5 that the plastic bushing—which may be out of nylon—preferably has a small circular centrally located hub 57 that extends downwardly from the body 58 of the bushing thus protecting the center rod during its stroke from striking the insert 52 and also providing a longer sliding bearing. These features in turn help to reduce flexing of the center rod and to maintain its alignment along the axis.

The other end of the centering pin has a threaded section which serves as a connector to the support means 62 that supports the center pin 60 for reciprocal motion in the direction of the axis. As best illustrated in FIGS. 3 and 4 the center rod is connected by a support means, namely coupling and lock nut 65 to the plunger or piston 28 of a means for reciprocating 66 which includes a means to drive (28, 66) the center pin and centerpin support means (e.g. coupling 64) back and forth substantially along the axis. The drive means includes preferably a double-acting fluid operated cylinder 66 and plunger 28 (the center pin 25 being connected on the plunger as noted above) and is preferably operated by compressed gas and even more preferably by compressed air. It serves to reciprocate the center pin 25 and support means back and forth along the coaxial axis 4 of the preform, bottle to be, cavity and mold. As explained further in reference to FIG. 4, the drive means also affords the desired bias against expansion of the preform so that the centering action is realized. The air cylinder plunger 28 also has a stop secured to the plunger staff a resilient bumper 68 on either the stop 69 or the upper face of the cylinder 66 (preferably the former) and is located along the cylinder plunger by the lock nut 70.

While a pneumatic cylinder, especially one employed in conjunction with compressed air, is preferred as a drive means it should be understood that the drive means 66 of the invention does embrace using a hydraulic cylinder. Where the bottle or other container is intended for beverages, food or other ingestible products, it is desired to avoid using hydraulic equipment because oil leaks and the mist from oil exhausts create sanitation as well as safety hazards.

The means for reciprocating 66 is designed to reciprocate the center pin 25 between a first position 75, illustrated in lane D where the shaped mold end 44D or annular surface 44D is in register with the adjacent mold cavity surface 34D to define at least a part of the bottom, and second position 77 along the axis toward the open end of the preform or upper end of the mold where the shaped face 44D is engageable by the preform. In the preferred embodiment, however, this second position 77 is not so far into the mold that the preform engages the center rod upon its introduction into the mold. Instead, there is a small spaced 78D as illustrated in lane D, so that the preform has to expand axially just a small amount to achieve engagement with the center rod.

The reciprocating means (stroking means) also includes a circuit 80 to control the operation of the double acting cylinder, a preferred embodiment using compressed air being illustrated in FIG. 6. It is assumed that a suitable compressed air source such as a compressor, reservoir, or the like is upstream of the described system. It feeds through a conduit 81 into a pressure regulator 82 which adjusts the pressure to a desired level, preferably 20 psig. From the pressure regulator 82 the fluid passes to a solenoid valve 84 which serves the purpose of switching lines or connections of the ends of the cylinders 66A ... 66D between fluid under pressure (from 81) and exhaust conduit 85. This is normally called a solenoid valve and may be operated by an electrical solenoid by timing means—limit switch 87—on the blow molding machine.

Downstream of the solenoid valve are a plurality of double-acting cylinders, all connected in parallel across conduits 88, 89. Four cylinders, one for each lane, are illustrated. The lower end 88 (given same number as conduit 88 for ease of tracing) of each cylinder provides the power, when compressed or other pressurized fluid is supplied thereto, to position the center pin 25 along the axis 4 within the mold by driving the same upwardly to the second position 77 as illustrated in FIG. 4. The lower end 88 is also, when motion is reversed during expansion or blowing of the bottle, the means affording bias against the motion whereupon centering action is realized. This bias keeps the center rod engaged continuously with the preform during blowing except for the very short instance of time when the gap 78D between preform and center rod is closed at the very beginning of blowing.

In any event, the lower portion of each cylinder 66 is connected to the solenoid valve through the regulator and flow control device 90 consisting of a check valve 92 opposing exhaust from the cylinder in parallel with a restriction 94, which may comprise a globe valve or other adjustable flow control means or even a throttle plate. The purpose is to provide a greater flow capacity for pressurized fluid, e.g., compressed air, which enters the cylinder and powers it up but provides a more restricted exhaust area to secure the engagement and bias explained above.

The upper end 89 of each double-acting cylinder, shown as the upper end in the Figs., is connected directly to the solenoid valve 84. In all instances, conventional conduit is used such as pipe, tubing, flexible conduit. Valve 84 is connected to an exhaust 85 which preferably contains a muffler 95.

A sensor 87A . . . 87D (the current popular name for what used to to be called a limit switch, Microswitch, etc. but which preferably are each a proximity switch) in each lane functions as an optional feature, a fair safe device: all sensors must announce that all center rods 25 are completely down before the bottles can be moved laterally (in the plane of the paper) out of the mold. This feature is no part of the present invention, the electrical circuitry is not either, and may in fact comprise circuitry already prior art by way of public sale and use. Of course, if the present invention is used with other molding means than illustrated herein, e.g., where the bottles are demolded along axis 4, then a different fail safe system—if one is used at all—has to be selected.

The flow of compressed air through 88 is shut off by the center rod 25 reaching its uppermost position 77. Upon that event, the solenoid valve 84 switches not only to shut off compressed air to but to connect the lower end 88 of each drive means (air cylinder) to the exhaust system. The flow control means 90 consisting of the check valve and resistor 92, 94 in parallel now serves to hold compressed air in the lower end of the cylinder, or rather to resist its outward rush, for a time sufficient for the blowing operation to begin whereupon the expanding bottom of the preform pushes the gate 17 into the recess 45 and engages the center rod and thereby moves the plunger 28 down in each respective cylinder. In this manner, the resilient bias of the center rod against the bottom of the preform is realized.

The process of the invention will now be explained in connection with all of the foregoing Figs. and a review of how the entire blow molding machine operates. A preform carrier means of any well-known type brings the preforms 2 to the parted blow molds 14A . . . 14D and positions them as seen in FIGS. 4. The blow molds 14 are now automatically closed with the locating surface 12 of each preform situated on the very top of the blow mold and the bottom (preferably) at second position 78D. This encloses each preform within two mold haves (which form mold assembly 14). Blow plug 38 is not brought down along the axis of each preform and inserted in the neck or open end thereof.

With things in this posture, center pin 25 is moved along the axis within the cavity from the first position as of 44D at the bottom of the cavity up to its second position as at 77 as in dotted lines in lane D. The center pin 25 is constructed as elsewhere described, with a shaped face 44 surrounding recess 45 to receive the gate 17 and is stopped at 77D just short of engagement with the bottom center of the preform 2D.

Blow air from 38 is now admitted to the inside of the preform. Initially, the preform expands both radially and axially. The axial expansion brings the gate 17 within the center rod recess 45, e.g., as shown for lane A. The preform bottom 16, 17 and center rod 25, 44, 45 are now engaged and as blowing continues the center rod 25 is maintained in engagement with the preform bottom during the remainder of the blowing step. This maintaining of engagement is achieved by the pneumatic bias built into the pneumatic system 80 described schematically in connection with FIG. 6. The exhaust gas from the lower end 88 of the double-acting cylinders encounters a restricted passageway at the throttle member 94 on its way out of the system to the exhaust at the muffler.

The blowing is completed for purpose of the center rod operation when center rod 25 reaches its so-called first position as at 75D at the bottom of the blow mold where the annular surface about the gate recess is aligned or in register with the adjoining portions of the blow mold.

An external center rod system according to this invention affords the following advantages over other systems for centering an expanding workpiece: reduction in cycle time over use of internal center rods in otherwise similar systems; better or more even distribution of the plastic material (e.g., more even bottle wall thickness), especially if it is PET; and permits use of preforms with substantially eccentric bores (i.e., off-center holes), hence having differeing wall thicknesses, which preform properties have often required rejection with such other systems. Many preforms that are not straight (called "bananas"), i.e., have a bent longitudinal axis, can oftentimes be used even though they might not be acceptable for use on other devices. Commercially unacceptable preforms being unacceptable by reason of having a slightly but observable, eccentrically located gate on the closed end thereof, such as to produce commercially unacceptable bottles therefrom in prior art molding equipment and methods, may be advantageously used in the practice of this invention to produce bottles of commercially acceptable quality. The present invention may be used in horizontal stretch blow as well as the illustrated vertical stretch blow and in rotary and turret type stretch blow as well as the illustrated linear unit. The language employed in the claims is intended to cover these variations on the main theme.

The center rod 25 ordinarily travels for a distance greater than one-half inch, a feature which distinguishes it from the so-called three-part mold known in the art. Three-part molds are used to make a bottle with an unusual shaped bottom, such as a free-standing bottle which has portions which are undercut relative to the horizontal motion of the other two parts of the mold. The instant center rod system has a rod that reciprocates through a hole in the bottom of the mold and indeed which retracts the molding surface 44 of the rod 25 to a point where it forms a part of the mold surface by aligning itself with adjoining parts of the molds such as 30. Normally, the center rod comes into alignment when its surface 44 aligns itself with the bottom of the mold 30 to define the molding surface for the bottom of the bottle against which the preform is blown. As already noted, and as distinguished from the aforenoted three-part molds, center rods according to the present invention, preferably move more than one-half inch in connection with exercising the office in this system.

In the described system, the center rod of lanes A and D is arranged with a gate recess 45 to accomodate a preform with a gate 17. However, in lanes B and C preform recess 45 may be omitted (providing, of course, the molding surface 44): In such case, the preform gate must be elsewhere such as, for example, on the neck portion or finish 5 which may include the various components numbered herein 5 through 12 inclusive. The pallet or neck ring 36 may be constructed in any manner known to the art, for example, according to the pallet of U.S. Pat. No. 4,185,812 or the neck ring of pending allowed U.S. application Ser. No. 117,497 owned by the same assignee.

There may be employed in the practice of this invention preforms, as described herein, which have been prepared from polyethylene terephthalate, polyethylene, polypropylene, polyvinyl chloride thermoplastic resins. Thermoplastic resins which can be biaxially oriented by blow molding are preferred in the practice of this invention. More preferably polyethylene terephthalate is used in the practice of this invention.

What is claimed is:

1. In a process for making a plastic container of thermoplastic resin by blow molding within a blow mold assembly being openable and comprising at least one mold which is openable, the steps comprising:
   (a) assembling each openable mold to form along an axis a cavity shaped substantially like the container;
   (b) suspending in the cavity an elongated tubular preform which is shorter than the container and which is open at one end and closed at the other end, the open end of the preform being held substantially on said axis by a neck ring which also cooperates with the blow mold assembly to seal the neck end of the cavity, there being no mechanical element which engages the interior bottom portion of the preform;
   (c) inserting a blow plug;
   (d) admitting blowing fluid into the preform through said blow plug;
   (e) thereby expanding the preform along said axis and in a peripheral direction in a plane normal thereto, called the hoop direction, into engagement with the mold walls defining the cavity to form the container, the improvement comprising the steps of:
   (f) providing a reciprocative center pin movable along said axis within said cavity having a shaped upper face for engagement with the exterior closed end of the preform;
   (g) positioning the upper face of the center pin in the cavity in close spaced relation to the exterior surface of the closed end of the preform;
   (h) extending the preform along the axis of the mold by the blowing fluid force to position the exterior closed end of the preform against the shaped upper face; and
   (i) maintaining the center pin substantially engaged with the preform during the expanding step, with a force insufficient to resist the axial expansion of the preform.

2. A process according to claim 1 wherein said thermoplastic resin is a homopolymer or copolymer polyolefin resin.

3. A process according to claim 1 wherein said preform has a gate extending outward from the closed end thereof and the shaped face has a gate receiving recess.

4. A process according to claim 1 wherein said thermoplastic resin is homopolymer or copolymer vinyl resin.

5. A process according to claim 4 wherein said preform has a gate extending outward from the closed end thereof and the shaped face has a gate receiving recess.

6. A process according to claim 1 wherein the container is a bottle.

7. In a process for making a plastic bottle of biaxially oriented polyester resin by blow molding within a blow mold assembly being openable and comprising several individual molds each of which is openable, the steps comprising:
   (a) assembling each openable mold to form along an axis a cavity shaped substantially like the bottle;
   (b) suspending in the cavity an injection molded elongated tubular preform which is shorter than the bottle and has one end open and the other end closed, the closed end having a gate extending outward therefrom and being substantially centrally located and surrounded by an area that including the gate is more crystalline than the rest of the preform, the open end of the preform being held substantially on said axis by a neck ring which also cooperates with the blow mold assembly to seal the neck end of the cavity, there being no mechanical element that enters the preform and engages the interior closed end thereof;
   (c) inserting a blow plug;
   (d) admitting blowing fluid into the preform through said blow plug;
   (e) thereby expanding the preform along said axis and in a radial direction substantially normal thereto, called the hoop direction, into engagement with the mold walls defining the cavity to form the bottle, the improvement comprising the steps of:
   (f) providing a center pin movable along the axis within the cavity having a shaped upper face with a recess therein to receive the gate and an annular bottom surface surrounding the recess of a size in the hoop direction at least that of the more crystalline area;
   (g) positioning the upper face of the center pin in close spaced apart relation to the exterior closed end of the preform;
   (h) extending the preform along the axis of the mold cavity by the blowing fluid force to position the gate of the preform within the recess and the more crystalline area against the annular surface; and
   (i) maintaining the center pin substantially engaged with the preform during the expanding step, with a force insufficient to resist the axial expansion of the preform.

8. A process according to claim 7 for making more than one plastic bottle substantially simultaneously wherein each of said steps is conducted at about the same time on its respective preform.

* * * * *